United States Patent [19]

Reavis

[11] 4,172,649
[45] Oct. 30, 1979

[54] MAGAZINE FOR GLASS PHOTOGRAPHIC PLATES

[75] Inventor: Joe E. Reavis, Sewanee, Tenn.

[73] Assignee: The United States of America as represented by the Secretary of the Air Force, Washington, D.C.

[21] Appl. No.: 922,604

[22] Filed: Jul. 7, 1978

[51] Int. Cl.² ............................................. G03B 19/10
[52] U.S. Cl. .................................................. 354/175
[58] Field of Search ....................... 354/174, 175, 276; 352/98, 99; 250/268, 270

[56] References Cited

U.S. PATENT DOCUMENTS

| 425,005 | 4/1890 | Schwarz | 354/174 |
| 441,018 | 11/1890 | Nowlan | 354/175 |
| 741,215 | 10/1903 | Barrett et al. | 354/175 |
| 2,122,870 | 7/1938 | Santoni | 354/175 |
| 2,286,010 | 6/1942 | Rabkin | 354/174 |

FOREIGN PATENT DOCUMENTS

| 58632 | 2/1891 | Fed. Rep. of Germany | 354/175 |
| 5860 | of 1890 | United Kingdom | 354/174 |

Primary Examiner—L. T. Hix
Assistant Examiner—Shelley M. Wade
Attorney, Agent, or Firm—Joseph E. Rusz; Arsen Tashjian

[57] ABSTRACT

A rotary magazine which permits the storage and the consecutive, rapid, exposure of a plurality (i.e., preferably twenty-four) of glass photographic plates. Holders for the photographic plates are pivotally connected to the periphery of a wheel in equal spaced-apart relationship, and are spring loaded so that they can be rotated in only one direction. The plates are rapidly exposed, one at a time. Unlike the prior art, and especially with regard to holograms, the magazine eliminates the undesired lapse of time that is inherent in manually changing the photographic plates. Therefore, less correlation is necessary for temporal changes which occur while "photographing" (i.e., recording) the same, but rapidly time-changing, subject scene (e.g., icing of water droplets). The magazine is particularly well suited to obtain a large number of holograms in rapid sequence.

6 Claims, 9 Drawing Figures

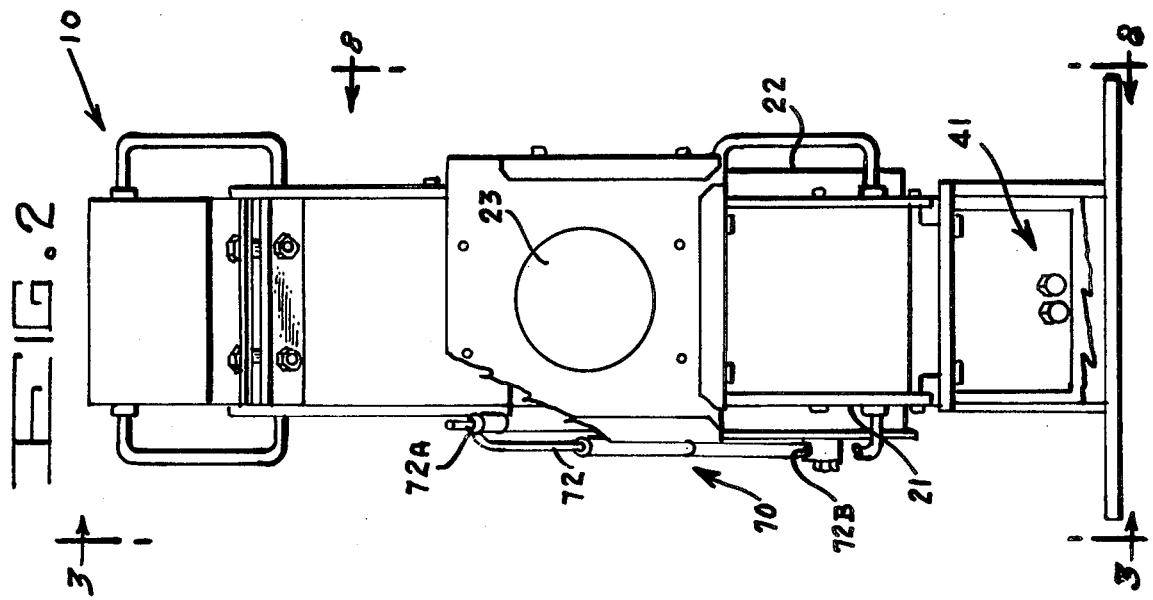
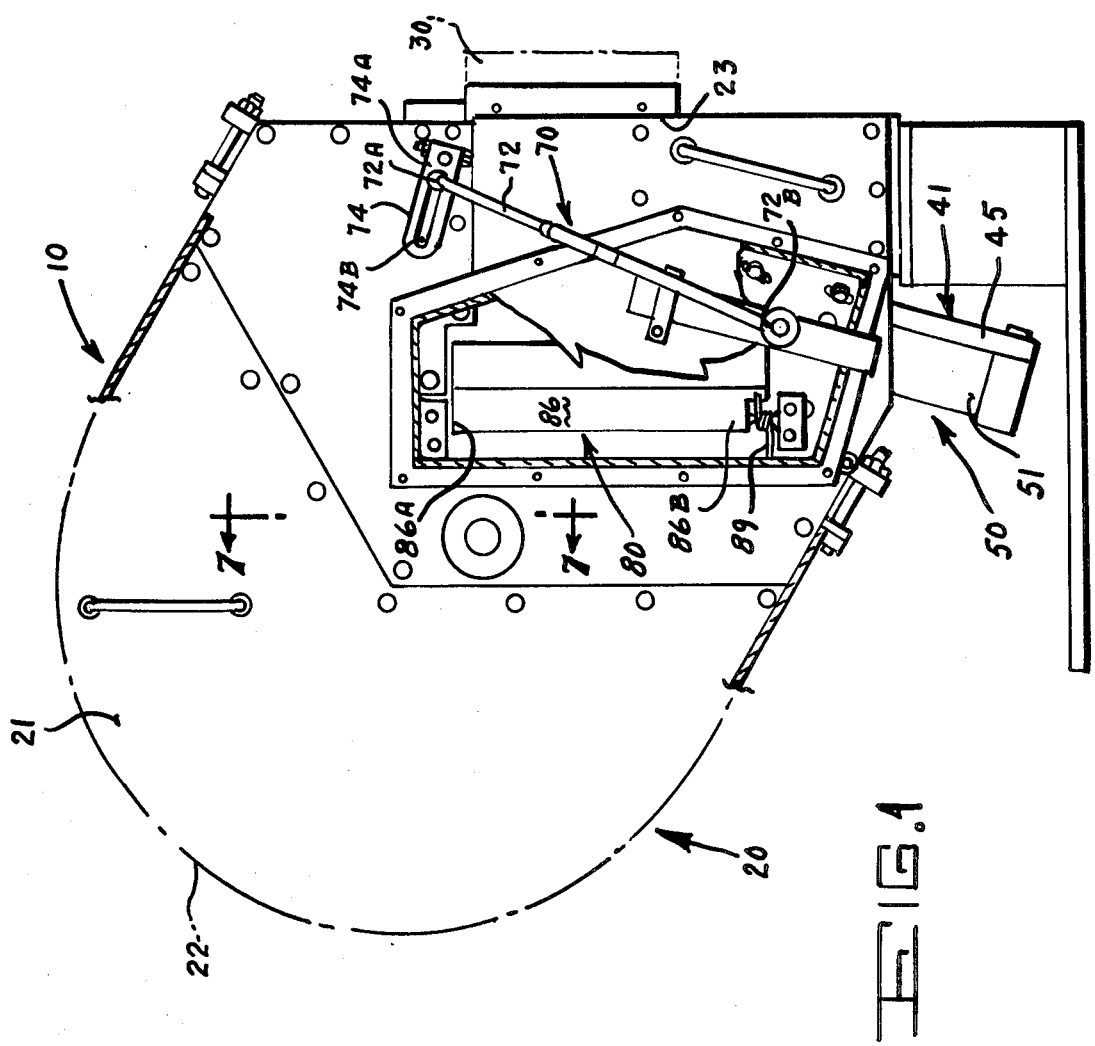

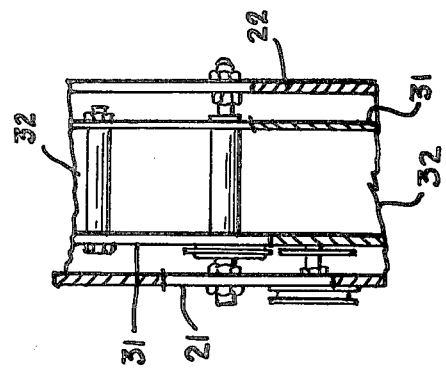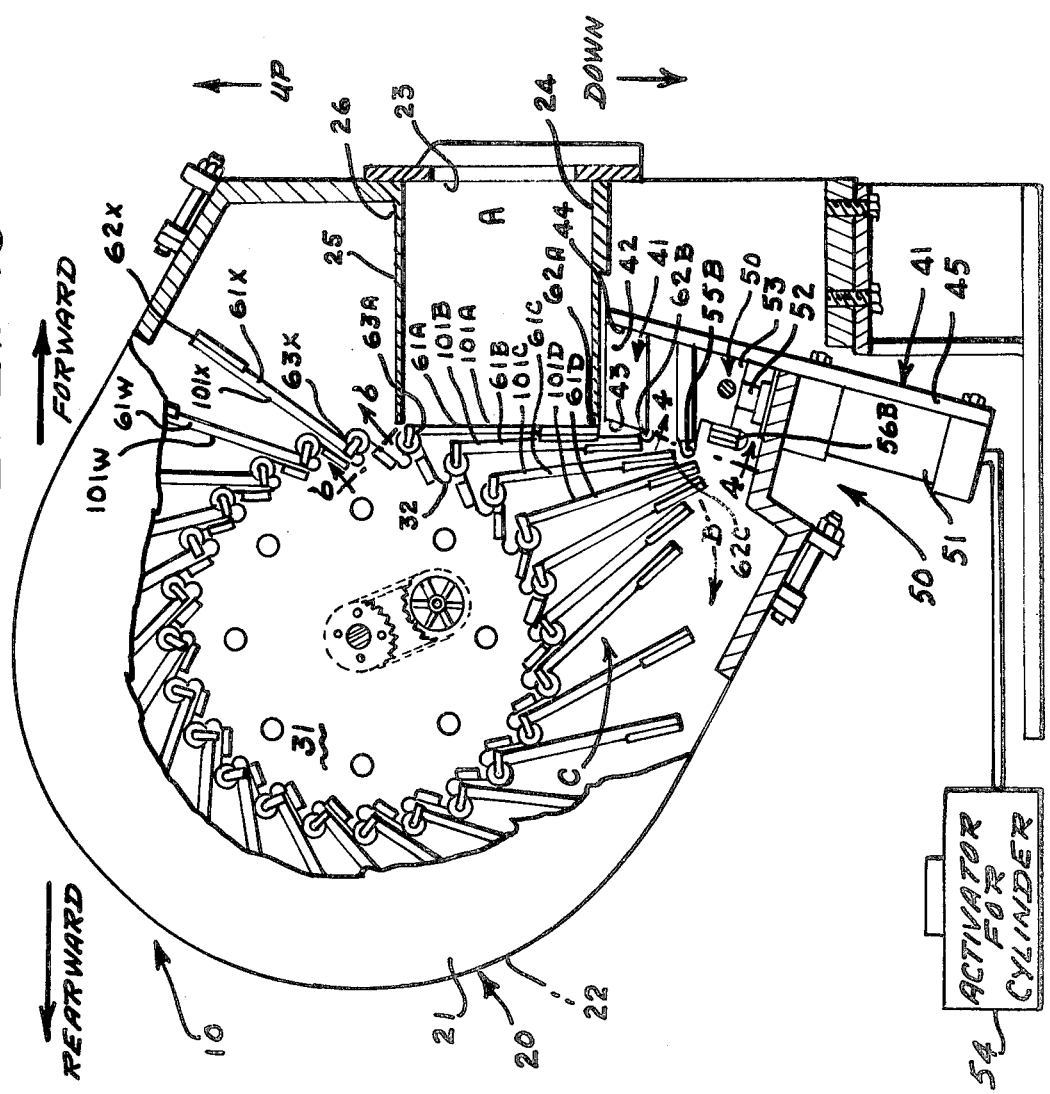

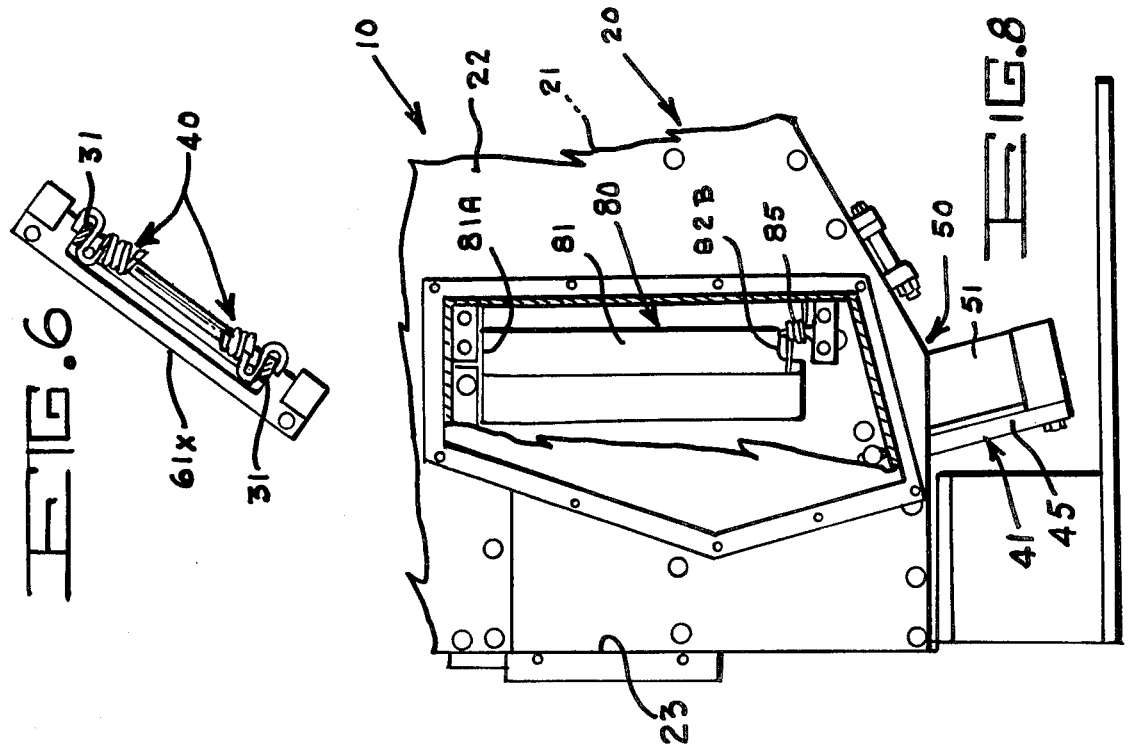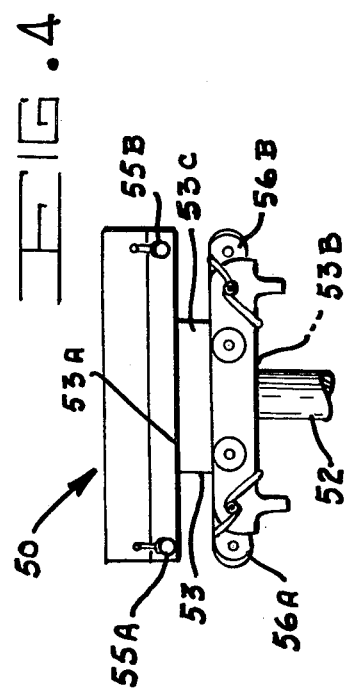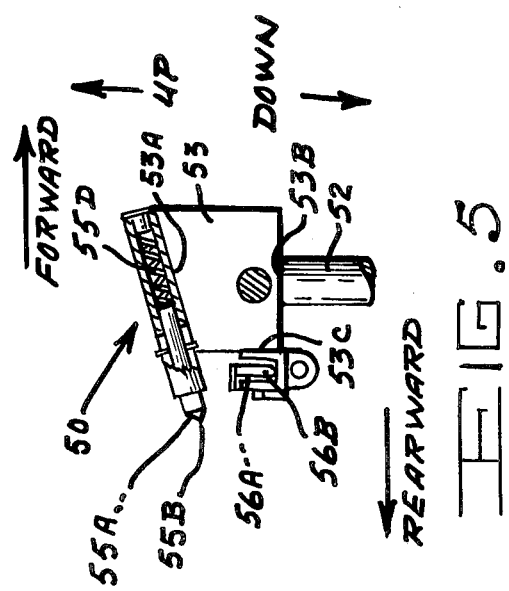

MAGAZINE FOR GLASS PHOTOGRAPHIC PLATES

STATEMENT OF GOVERNMENT INTEREST

The invention described herein may be manufactured and used by or for the Government for governmental purposes without the payment of any royalty thereon.

BACKGROUND OF THE INVENTION

This invention relates to a unique magazine that is adapted for use in combination with a plurality (preferably twenty four) of glass photographic plates.

Magazines, as such, for photographic materials are old and are well known. Equally well known in the prior art is the fact that, in using a large number of glass photographic plates to record a rapidly changing basic scene (or a rapid sequence of events), the art-accepted method of manually changing (and, thereafter, exposing) the many glass photographic plates is less than satisfactory, because the lapse in time in changing the plates requires after-the-fact correlation with the changes in time during which the basic scene is changing. At worst, as sometimes occurs, the lapse necessary to change the plates may occur just as the desired, and much sought, change in the scene also occurs. As a result, the photographed changing scene is inaccurate, simply because the photographed changing scene is incomplete due to the pertinent omission.

Experience and analysis clearly establish that what is needed in the art (particularly with regard to the obtaining of holograms), but is not available, is an apparatus that will alleviate, if not completely eliminate, this inherent disadvantage.

I have invented a unique apparatus, i.e., a magazine for use in combination with a plurality of glass photographic plates, that will fulfill this need; and thereby, I have significantly advanced the state-of-the-art.

SUMMARY OF THE INVENTION

The principal object of this invention is to provide a magazine, for use in combination with a plurality (i.e., preferably twenty four) of glass photographic plates, which permits the storage of the plates and, more importantly, the consecutive, rapid, exposure of the plates, so that less correlation (or, in fact, no correlation) is needed for temporal changes which occur while recording the same (but changing) subject scene, such as the icing of water droplets.

Another object of this invention is to permit the taking (i.e., the obtaining, making, and the like) of a large number (e.g., 24) of holograms in rapid sequence.

These objects, as well as other related objects of this invention, will become readily apparent after a consideration of the description of the invention, together with reference to the Figures of the drawings in which the same reference numeral or character refers to the same element, member, component, subassembly, or the like.

DESCRIPTION OF THE DRAWINGS

FIG. 1 is a left side elevation view, in simplified form, partially pictorial, partially schematic, and partially fragmented of a preferred embodiment of the invention;

FIG. 2 is a front view, in the same form as FIG. 1, of the preferred embodiment;

FIG. 3 is the view of the preferred embodiment, as seen along line 3—3 of FIG. 2.

FIG. 4 is the view of a means component of the preferred embodiment of the invention, as seen along line 4—4 of FIG. 3;

FIG. 5 is a side elevation view, in simplified form, both pictorial and schematic, of the means component shown in FIG. 4;

FIG. 6 is a view of a representative photographic plate holder, in simplified form, both pictorial and schematic, as seen along line 6—6 of FIG. 3;

FIG. 7 is the view of a portion of the preferred embodiment, in simplified schematic form and partially fragmented, as seen along line 7—7 in FIG. 1;

FIG. 8 is the view, in simplified form, both pictorial and schematic, of a portion of the preferred embodiment, as seen along line 8—8 of FIG. 2.

DESCRIPTION OF THE PREFERRED EMBODIMENT

Figure 9:
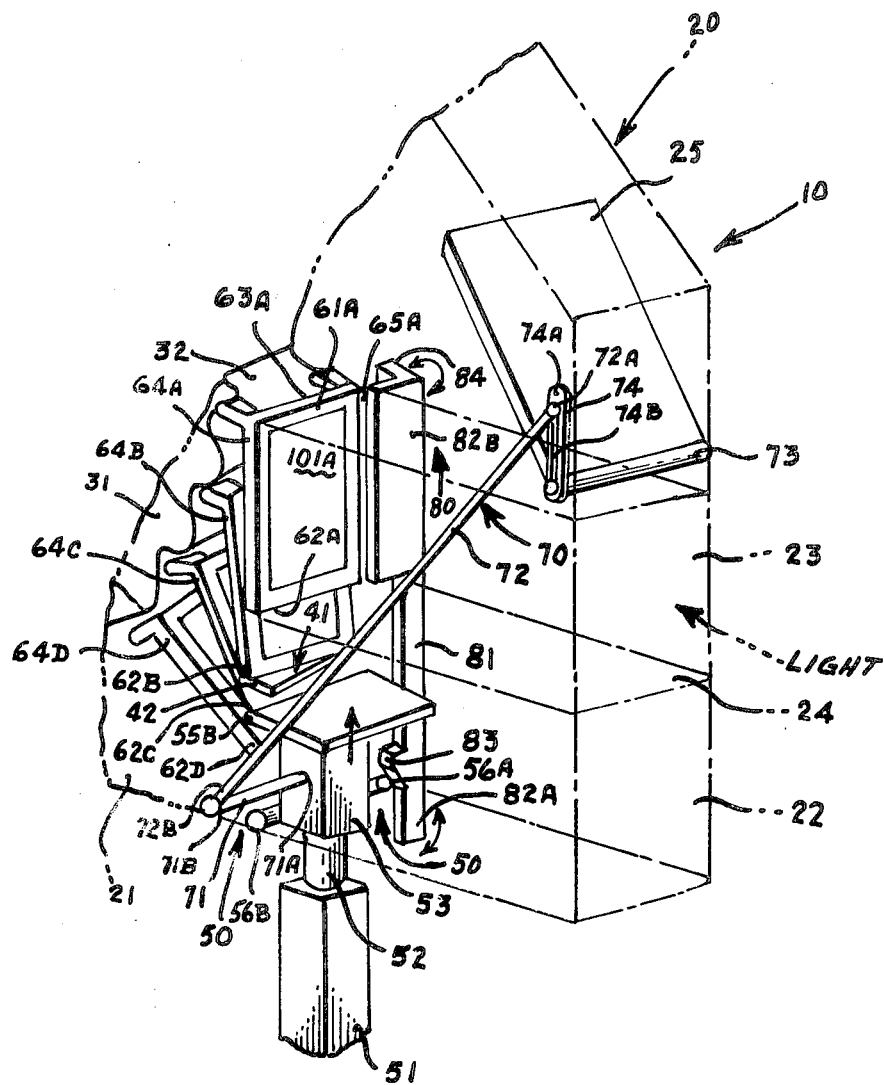
FIG. 9 is a perspective view, in simplified form, partially pictorial, partially schematic, partially fragmented, and partially in phantom of a portion of the preferred embodiment.

With reference to FIGS. 1-9, inclusive, the preferred embodiment 10, FIGS. 1, 2, 3, 8 and 9, of the invention comprises, in its most basic and generic structural form, seven (7) major components, means, and the like, which are connected and which interact and cooperate, so that the invention 10 performs the desired functions.

These major components, means, and the like are:

A. Firstly, a light impervious housing 20, FIGS. 1, 2, 3, 8, and 9 having: a first side element 21 and a second side element 22; an aperture 23 located between the first and second side element 21 and 22, with the aperture 23 selectively openable and closeable by suitable conventional means 30 which may, for example, be a shutter; a floor plate element 24 disposed within, and affixed to, the housing 20, with this floor plate element 24 also positioned below the aperture 23 and extending rearwardly away from the aperture 23; and, a top door element 25 disposed within the housing 20, with this top door element 25 positioned above, and extending rearwardly away from, the aperture 23, and with the top door element 25 having a first edge 26 by which it is pivotally attached to the housing 20. It is here to be noted that the closed aperture 23, the first and second side elements 21 and 22, the floor plate element 24, the top door element 25, and a suitably positioned glass photographic plate holder, such as 61A, FIG. 3, in which is releasably held a glass photographic plate, such as 101, FIG. 3, collectively limit and define a light impervious chamber, generally designated "A", FIG. 1, which may be opened (to permit the entry of light) for photographic exposure purposes by opening the aperture 23, with and by means 30, thereby exposing glass photographic plate 101. In this regard, see the arrow which is legended "Light" in FIG. 9.

B. Secondly, a pin wheel 31, FIGS. 3, 7 and 9, having a peripheral surface 32, with the pin wheel 31 rotatably attached to, and disposed with, the light impervious housing 20, and with the pin wheel 31 simultaneously also disposed such that the peripheral surface 32 is rearwardly, FIG. 3, of the aperture 23.

C. Thirdly, a plurality of glass photographic plate holders (hereinafter each one will be referred to as a "holder"), such as representative holders 61A, 61B, 61C and 61D, FIGS. 3 and 9 and 61X, FIGS. 3 and 6, with each holder of the plurality configurated, structured, and dimensioned to accept, support, and releasably hold a different one of a plurality of glass photographic plates (hereinafter referred to as "plates" or, individually, a "plate"), such as representative plates 101A (held by 61A), 101B (held by 61B), 101C (held by 61C) and 101D (held by 61D), FIGS. 3 and 9, and 101X (held by 61X), FIGS. 3 and 6, and with each holder having a first end (such as 62A of holder 61A, and so on), a second end (such as 63A of holder 61A, and so on), a first side edge (such as 65A of holder 61A, and so on), and a second side edge (such as 64A of holder 61A, and so on), FIGS. 3, 6 and 9, wherein each second end (such as 63X for holder 61X, and 63A for holder 61A) is pivotally connected to the peripheral surface 32, FIGS. 3 and 9, of the pin wheel 31, FIGS. 3 and 9, and wherein all the second ends are connected in equal spaced-apart relationship, as shown in FIGS. 3 and 9, and also wherein each second end connection to the pin wheel 31 is by and with a biasing means 40, FIG. 6, for urging movement away from the aperture 23, i.e., counterclockwise, as is shown in FIG. 3 by the arrow that is designated "B". It is here to be noted that the plate holders, such as 61B and 61W, are moved counterclockwise for exposure of the glass plate (such as 101B for 61B, and 101W for 61W), as is shown in FIG. 3 by the arrow that is designated "C".

D. Fourthly, a first means, generally designated 41, for releasably supporting the first end of each holder (such as 62B of holder 61B, FIG. 3), in serial fashion (i.e., consecutively, in sequential order, etc.) and only one holder at a time, with this (first) means 41 disposed internally of the housing 20 and affixed to the housing at a location below (i.e., downward of) the floor plate element 24, as is shown in FIGS. 3 and 9.

E. Fifthly, a second means, generally designated 50, FIGS. 1, 3, 4, 5, and 9, for urging upward the first end of each holder (such as 62C of plate 61C, FIG. 3), also in serial fashion and also only one holder at a time, with this (second) means 50 disposed essentially below (i.e., downward of) the first means 41 and connected to the housing 20. As shown in FIG. 3, this (second) means 50 preferably, because of its structure, is also positioned such that a portion of it (such as latch head 53, FIGS. 3, 4, 5, and 9) is located within the housing 20, FIG. 3, and also such that another portion of it (such as actuator cylinder 51, FIGS. 3 and 9) is located external of housing 20, as is shown in FIGS. 1, 3 and 9.

F. Sixthly, a third means, generally designated 70, FIGS. 1, 2 and 9, for pivoting the top door element 25, FIGS. 3 and 9, upwardly (as shown in FIG. 9), with this (third) means 70 connected to the second means 50 (as is also shown in FIG. 9).

G. Seventhly, and lastly, a fourth means, generally designated 80, FIGS. 1, 8 and 9, for releasably holding the first side edge (such as 64A, FIG. 9) and the second side edge (such as 65A, of FIG. 9) of each holder (such as 61A, FIGS. 3 and 9), also in serial fashion and only one holder at a time (as is shown for holder 61A in FIGS. 3 and 9), with this (fourth) means 80 in abutting contact with the second means 50 (as is shown in FIG. 9).

More specifically, the first means 41, FIGS. 1, 3 and 9, for releasably supporting the first end of each holder (such as first end 62B of holder 61B, FIGS. 3 and 9) includes an index tab member 42 having a first end 43 and a second end 44, FIG. 3, with the first end 43 shaped and sized to accept and support, in a platform-like manner, the first end of the holder being releasably supported (as is exemplified by the supporting of holder 61B and its first end 62B in FIG. 3), and with the second end 44 connected to a base member 45 which, in turn, is attached to housing 20.

Additionally, the second means 50, FIGS. 1, 3, 4, 5 and 9, for urging upward the first end of each holder (such as first end 62C of holder 61C, FIGS. 3 and 9), includes: an actuator cylinder 51, FIGS. 3 and 9 (such as is known in the art as an "Alkon Series K", and is commercially available from Alkon Products, Wayne, N.J.), having an upwardly and downwardly movable member 52, FIGS. 3, 4, 5 and 9, that partially protrudes from the cylinder 51; a fifth means 54, FIG. 3, for activating the actuator cylinder 51, thereby moving upward the movable member 52; and, a latch head 53, FIGS. 3, 4, 5 and 9, having a first (i.e., upper) end 53A and a second (i.e., lower) end 53B, with the second end 53B connected to the movable member 52, and with the first end 53A having a plurality of rearwardly facing plungers (such as 55A, FIGS. 4 and 5; and, 55B, FIGS. 3, 4, 5 and 9) that protrude beyond the first end 55A of the latch head 53, and that are biased (such as by spring 55D, FIG. 5, for plunger 55B) to remain retractably protruding (i.e., the plungers remain outwardly and rearwardly, until they are pushed forwardly with sufficient force, at which time they move inwardly), and also with the second end 53B of the latch head 53 having a rearwardly facing surface 53C, FIGS. 4 and 5, to which are connected, in a transverse position, two oppositely disposed rollers, i.e., first roller 56A, FIGS. 4 and 9, and second roller 56B, FIGS. 3, 4, 5 and 9.

Also, the third means 70, FIGS. 1, 2 and 9, for pivoting the top door element 25, FIGS. 3 and 9, upwardly (as is shown in FIG. 9) includes: a shaft 71 (or the like) having a first end 71A, FIG. 9, and a second end 71B, FIG. 9, with the first end 71A connected to the latch head 53 of the second means 50, FIG. 9; a push rod 72 having a first end 72A and a second end 72B, with this second end 72B pivotally connected to the second end 71B of the shaft 71 (as is shown in FIG. 9); a pivotal member 73, FIG. 9, connected to the top draw element 25; and a crank 74, FIGS. 1 and 9, having a first end 74A and a slot 74B, with the first end 74A connected to the pivotal member 73, and with the slot 74B slidably connected with and to the second end 72A of the push rod 72.

Further, said fourth means 80, FIGS. 1, 8 and 9, for releasably holding the first side edge (such as 65A, FIG. 9) and the second side edge (such as 64A, FIG. 9) of each holder (such as 61A, FIGS. 3 and 9), also in serial fashion and only one holder at a time (as is shown for holder 61A in FIGS. 3 and 9), includes: a movable first gate 81 having a first end 82A and a second end 82B, with the first end 82A having a first transversely positioned dog 83 which is in abutting contact the first oppositely disposed roller 56A, FIG. 9, of the latch head 53, and with the second end 82B of the first gate 81 having a portion 84 in the shape of a horizontally disposed "V", FIG. 9, that is in abutting contact with the first edge of each holder (such as first edge 65A of holder 61A), and also with this first gate 81 biased against movement by suitable means (such as spring 85, FIG. 8) and is captured (or is held captive) by the first side element 22, FIG. 8, of the housing 20, and also by the latch head 53; and, a second (mirror-image like) movable gate 86 having a first end 86A and a second end 86B, FIG. 1, and which is oppositely disposed so that (while first gate 81 releasably holds, for example, first edge 65A of holder 61A) it simultaneously releasably holds the second side edge 64, FIG. 9, of holder 61A, and which is biased by means 89, FIG. 1.

Additionally, as a matter of preference and not of limitation, the magazine 10 is intended for use with a plurality of twenty four (24) holders, as is shown in FIG. 3, with each of the holders releasably holding one glass photographic plate (i.e., a total of twenty four (24) plates), as is also shown in FIG. 3, and the latch head 53 has a plurality of two (2) rearwardly facing plungers (i.e., 55A and 55B), as is shown in FIG. 4.

MANNER OF OPERATION OF THE PREFERRED EMBODIMENT

The manner of operation of the preferred embodiment 10 of my inventive magazine can be easily ascertained by any person of ordinary skill in the art from the foregoing detailed description, coupled with reference to the Figures of the drawings.

For others, the following simplified explanation is made.

Each glass photographic plate, such as 101A, FIG. 3 is held in its own individual plate holder, such as 61A, FIG. 3, for plate 101A. The plate holders are pinned and are spring loaded around the periphery 32, FIG. 3, of the pin wheel 31. The wheel 31 is free to rotate inside of the light tight housing 20, FIG. 3. The plate holders are equally spaced apart, and are rotated so that one plate holder at a time is inserted in gates 85, FIG. 1, and 81, FIGS. 8 and 9, which in turn hold the plate holder, such as 61A, (and its plate, such as 101A) by its side edges, such as 64A and 65A for plate holder 61A. The chamber A, FIG. 3, is "sealed", and is made "light-tight", by: the plate and holder; the right side element 21 of the housing 20; the left side element 22 of the housing 20; the floor plate element 24; the top door element 25; and, the closed aperture 23. This plate 101A, FIGS. 3 and 9, is now ready for exposure. It is exposed by opening aperture 23, by and with the use of means 30, FIG. 3, which may be a shutter, and permitting the light from the scene (designated by a legended arrow, FIG. 9) to pass through the aperture 23 and to impinge upon the plate 101A. The shutter is now closed.

It is here to be noted and remembered that the succeeding (i.e., the next) plate holder is 61B, FIG. 3, and that, while the first plate holder 61A is ready for exposure in chamber A, this next plate holder 61B is at rest (on its bottom end 62B) on top of the first end 43 of index tab member 42, FIGS. 3 and 9. This prevents the other plate holders from rotating counterclockwise toward chamber A, because the plate holders are spring loaded to urge movement counterclockwise away from chamber A.

To move the next unexposed plate holder, such as 61B, FIG. 3, to chamber A, the actuator cylinder 51, FIGS. 3 and 9, is activated by the activator 54, FIG. 3; and, the movable member 52, FIG. 3, and the latch head 53 (together with its spring loaded plungers, such as 55B, and its rollers, such as 56A and 56B) and plate holder 61C, FIGS. 3 and 9, move upwardly. As the latch head 53, FIG. 9, moves upwardly, the rollers 56A and 56B open gates 81, FIGS. 9 and 8, and 82, FIG. 1, by striking dogs, such as 83, FIG. 9, on the gates. At the same time push rod 72, FIG. 9, opens the top door element 25, FIG. 9. Further (upward) movement of the latch head 53 brings the plungers, such as 55B, in contact with the plate holder 61B that is resting on the first end (or "shelf") 43 of index tab member 42. This results in rotating the pin wheel 31 counterclockwise, FIG. 3, and freeing the exposed plate 101A and its plate holder 61A. The holder 61A may and does swing through the open top of chamber A, FIG. 3. Then, the gates 81 and 85 close, providing a "nest" for plate holder 61B, which now is in chamber A. Meanwhile, plate holder 61C has moved upwardly on plungers 55A and 55B, and has come to rest on shelf 43 of index tab member 42, thereby preventing any further movement (in any direction) of pin wheel 31. Next, the latch head 53 (together with the plungers and rollers) moves downwardly, with the result that plate holder 61D depresses the plungers, until its bottom edge passes over them. At this time, the plungers extend outwardly; and, the rollers flip over the dogs on the gates, and return to their normal (i.e., deactuated) position.

The positioned plate holder 61B is now ready for the exposure of its photographic plate.

This procedure may be quickly repeated, with the result that all 24 glass photographic plates are consecutively, and rapidly, exposed.

CONCLUSION

It is abundantly clear from all of the foregoing, and from the Figures of the drawings, that the stated desired objects, as well as other related objects, of the invention have been achieved.

It is to be noted that, although there have been described the fundamental and unique features of my invention as applied to a preferred embodiment, various other embodiments, variations, adaptations, substitutions, additions, omissions, and the like may occur to, and can be made by, those of ordinary skill in the art, without departing from the spirit of my invention.

What is claimed is:

1. A magazine for use in combination with a plurality of glass photographic plates, comprising:
a. a light impervious housing having:
   (1) a first side element and a second side element;
   (2) an aperture located between said first and second side elements, with said aperture selectively openable and closeable;
   (3) a floor plate element disposed within, and affixed to, said housing, with said floor plate element also positioned below said aperture and extending rearwardly away from said aperture;
   (4) and, a top door element disposed within said housing, with said top door element positioned above, and extending rearwardly away from said aperture, and with said top door element having a first edge by which it is pivotally attached to said housing;
b. a pin wheel having a peripheral surface, with said pin wheel rotatably attached to, and disposed within, said light impervious housing, and with said pin wheel simultaneously also disposed such that said peripheral surface is located rearwardly of said aperture;
c. a plurality of glass photographic plate holders, with each holder thereof configurated, structured, and dimensioned to accept, support and releasably hold a different one of said plurality of glass photographic plates, and with each said holder having a first end, a second end, a first side edge, and a second side edge, wherein each said second end is pivotally connected to said peripheral surface of said pin wheel, and wherein all said second ends are connected in equal spaced-apart relationship, and also wherein each said second end connection to said pin wheel is by and with a biasing means for urging movement away from said aperture;

d. a first means for releasably supporting, in serial fashion and only one holder at a time, said first end of each said holder, with this said first means disposed internally of said housing and affixed thereto at a location below said floor plate element;

e. a second means for urging upward, in serial fashion and only one holder at a time, said first end of each said holder, with this said second means diposed essentially below said first means and connected to said housing;

f. a third means for pivoting said top door element upwardly, with this said third means connected to said second means;

g. and, a fourth means for releasably holding, in serial fashion and only one holder at a time, said first side edge and said second side edge of said holder, with this said fourth means in abutting contact with said second means;

whereby each one of said plurality of glass photographic plates can be stored within said magazine, and also can be selectively and consecutively exposed.

2. A magazine for use in combination with a plurality of glass photographic plates, as set forth in claim 1, wherein said first means for releasably supporting, in serial fashion and only one holder at a time, said first end of each said holder includes an index tab member having a first end and a second end, with said first end shaped and sized to accept and support, in a platform-like manner, said first end of said holder, and with said second end connected to a base member, wherein said base member is attached to said housing.

3. A magazine for use in combination with a plurality of glass photographic plates, as set forth in claim 2, wherein said second means for urging upward, in serial fashion and only one holder at a time, said first end of said holder, includes:

a. an actuator cylinder having an upwardly movably member protruding in part from said cylinder;

b. a fifth means for activating said actuator cylinder, thereby moving upward the said movable member protruding from said cylinder;

c. and, a latch head having a first end and a second end, with said second end connected to the said movalble member protruding from said cylinder, whereby said latch head is moved upwardly when the said movable member is moved upward by activation of said actuator cylinder, and with said first end having a plurality of rearwardly facing plungers protruding beyond said first end of said latch head, and biased to remain retractably protruding, and also with said second end of said latch head having a rearwardly facing surface to which are connected, in a transverse position, oppositely disposed first and second rollers.

4. A magazine for use in combination with a plurality of glass photographic plates, as set forth in claim 3, wherein said third means for pivoting said top door element upwardly includes:

a. a shaft having a first end and a second end, with said first end connected to said latch head of said second means;

b. a push rod having a first end and a second end, with said second end pivotally connected to said second end of said shaft;

c. a pivotal member connected to said top door element;

d. and, a crank having a first end and a slot, with said first end connected to said pivotal member, and with said slot slidably connected with and to said second end of said push rod.

5. A magazine for use in combination with a plurality of glass photographic plates, as set forth in claim 4, wherein said fourth means for releasably holding, in serial fashion and only one holder at a time, said first side edge and said second side edge of said holder includes:

a. a movable first gate having a first end and a second end, with said first end having a first transversely positioned dog thereat in abutting contact with said first oppositely disposed roller of said latch head of said second means, and with said second end of said first gate having a portion in the shape of a horizontally disposed V in abutting contact with said first side edge of said holder, wherein said first gate is biased against movement and is captured by said first side element of said housing and by said latch head of said second means;

b. and, an movable second gate having a first end and a second end, with said first end having a second transversely positioned dog thereat in abutting contact with said second oppositely disposed roller of said latch head of said second means, and with said second end of said second gate having a portion in the shape of a horizontally disposed V in abutting contact with said second side edge of said holder, wherein said second gate is biased against movement and is captured by said second side element of said housing and by said latch head of said second means.

6. A magazine for use in combination with a plurality of glass photographic plates, as set forth in claim 5, wherein said plurality of glass photographic plates is twenty four, and wherein said plurality of glass photographic plate holders also is twenty four, with each holder supporting and releasably holding a different one of said twenty four glass photographic plates, and also wherein said plurality of rearwardly facing plungers protruding from said latch head of said second means is two.

* * * * *